H. WHITING.
COMBINED TYPE WRITING AND COMPUTING MACHINE.
APPLICATION FILED MAY 14, 1914.
1,288,333.
Patented Dec. 17, 1918.
8 SHEETS—SHEET 1.
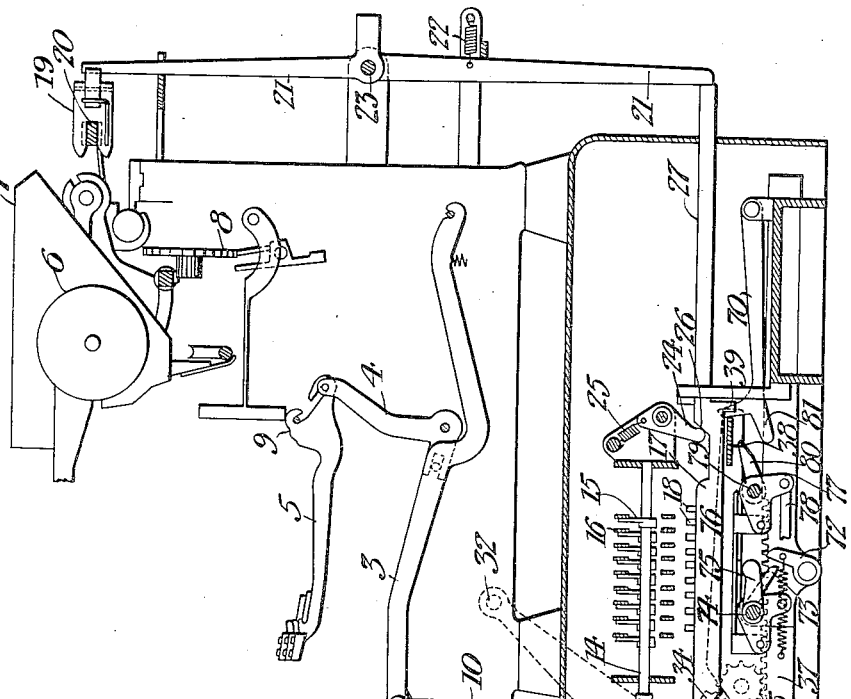
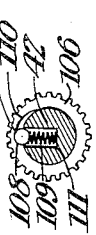
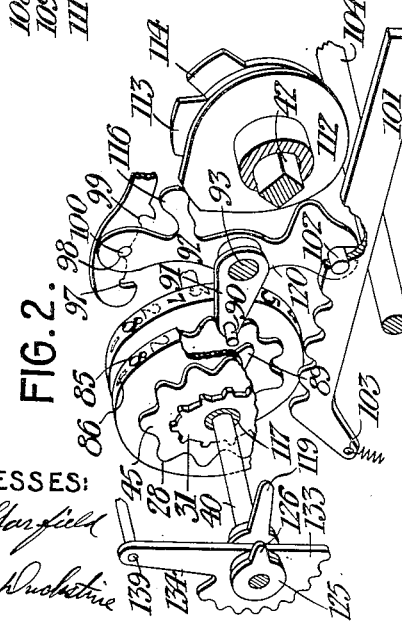
WITNESSES:
INVENTOR:
Horatio Whiting

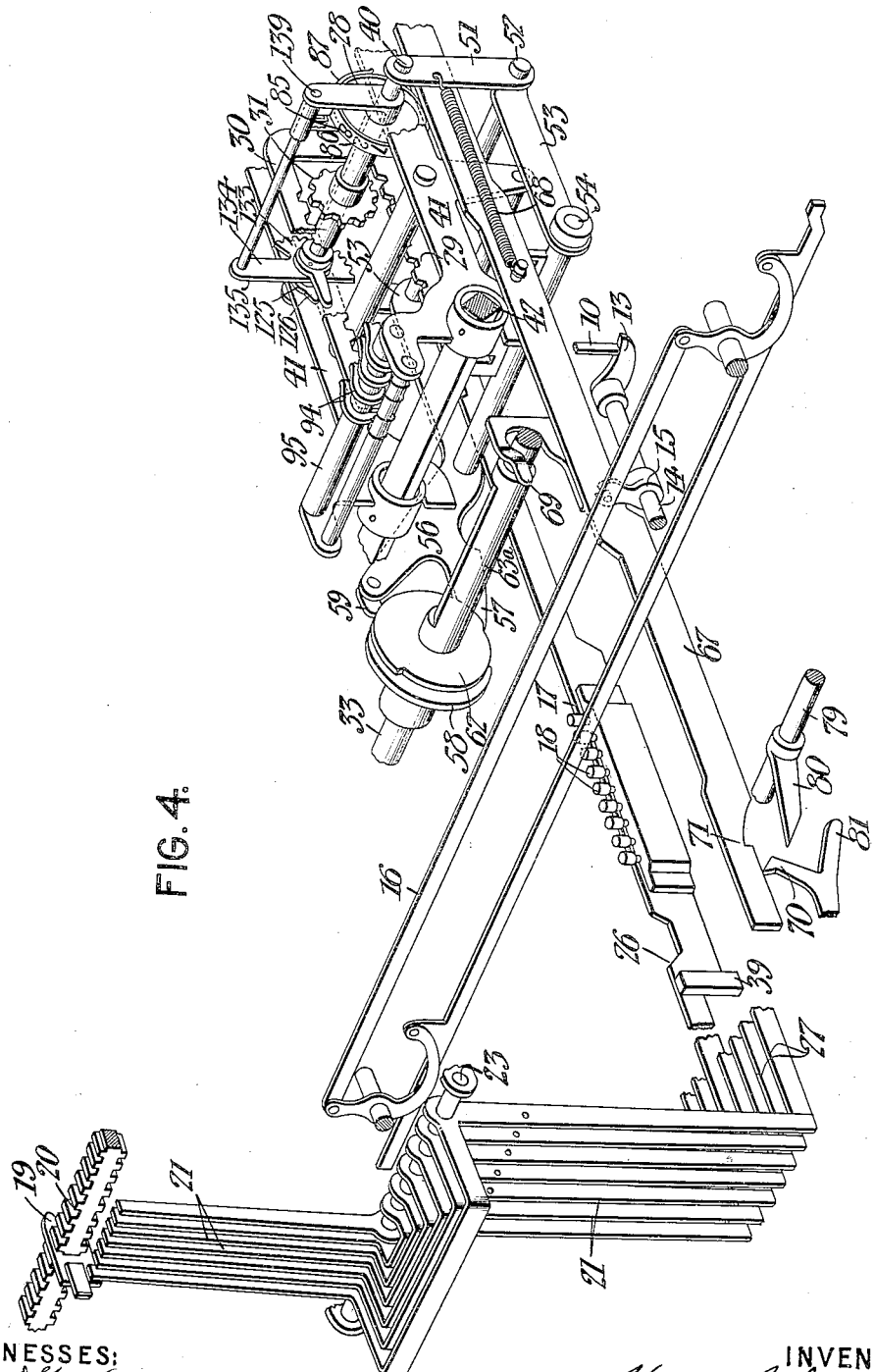

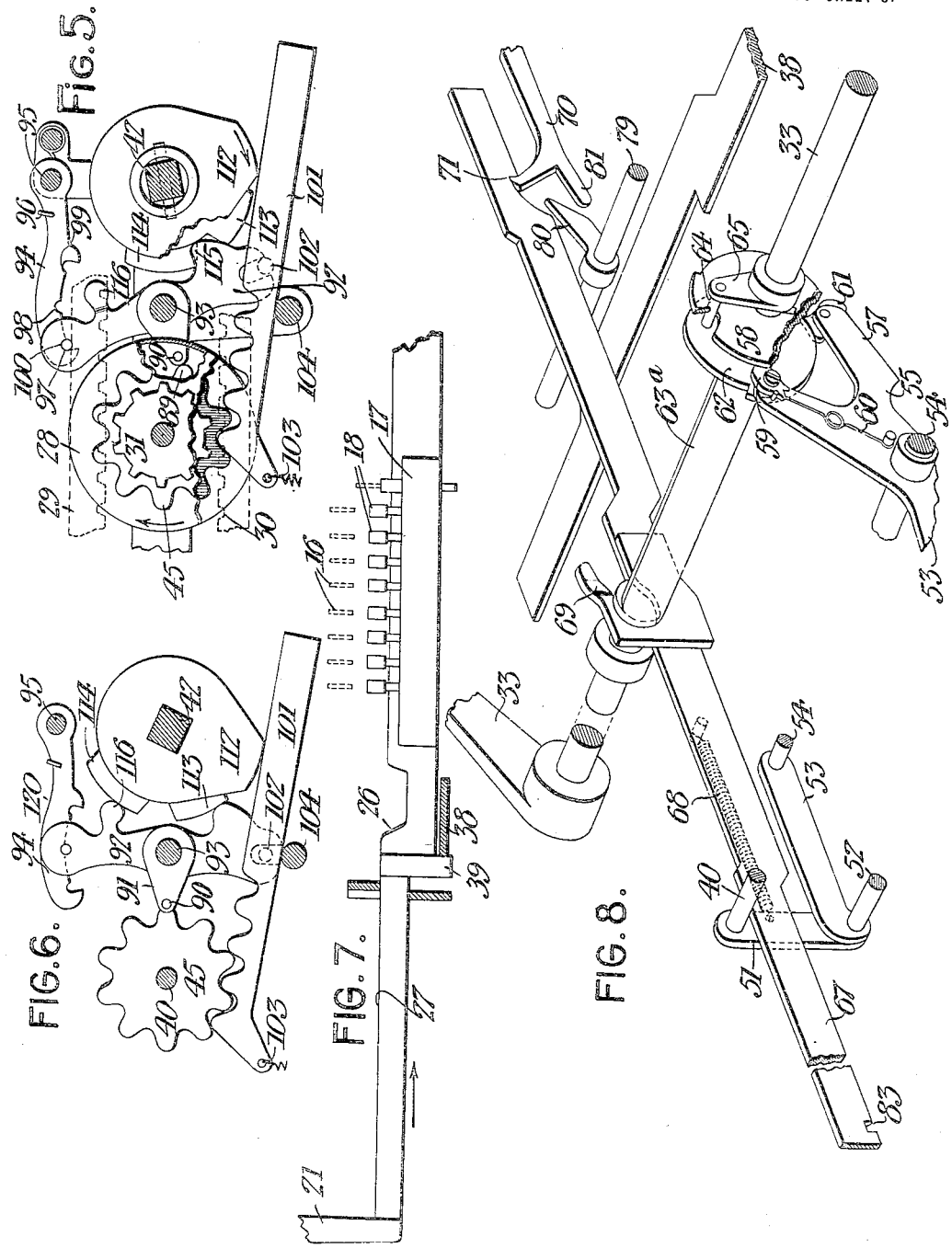

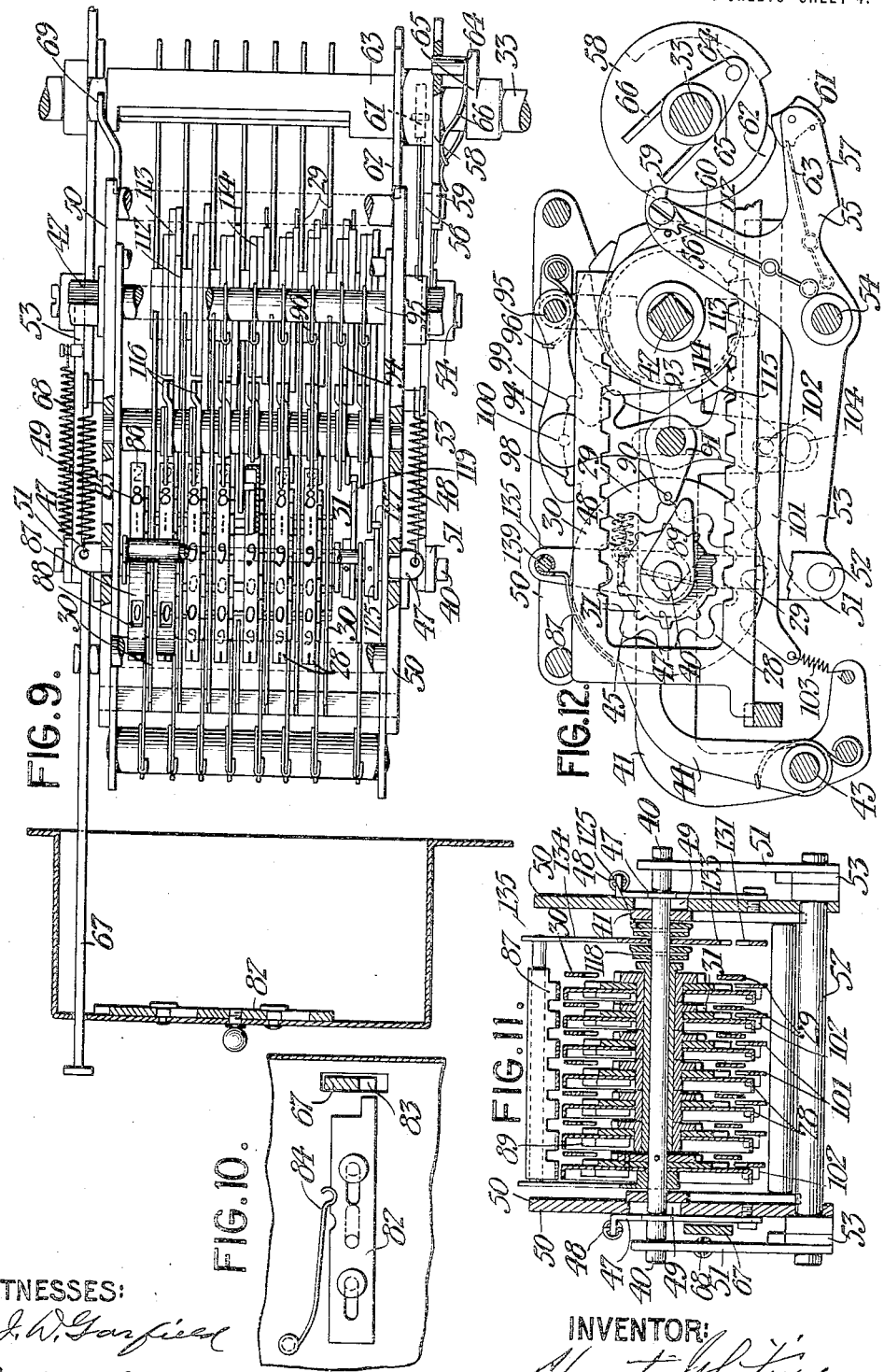

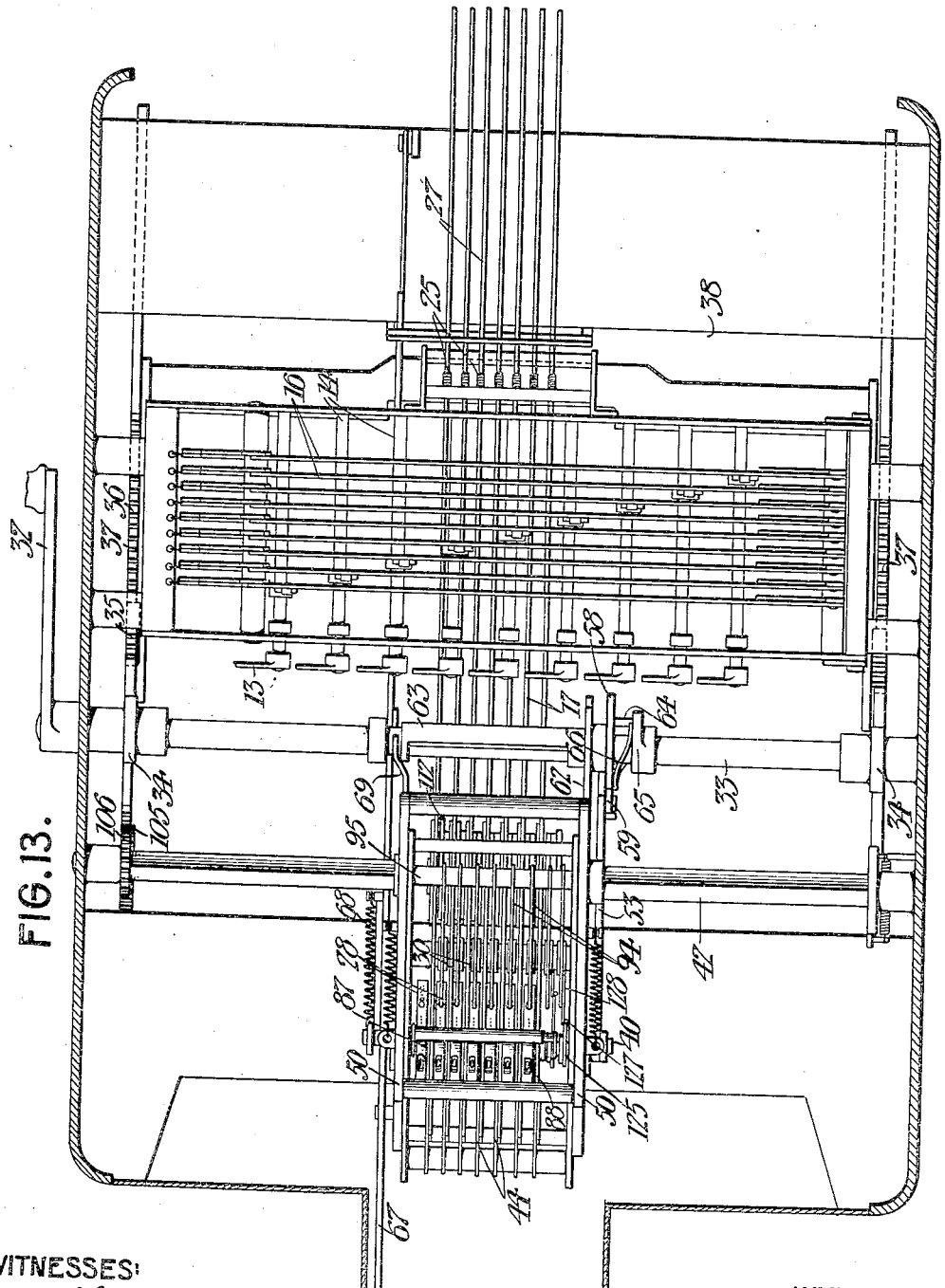

H. WHITING.
COMBINED TYPE WRITING AND COMPUTING MACHINE.
APPLICATION FILED MAY 14, 1914.
1,288,333.
Patented Dec. 17, 1918.
8 SHEETS—SHEET 6.
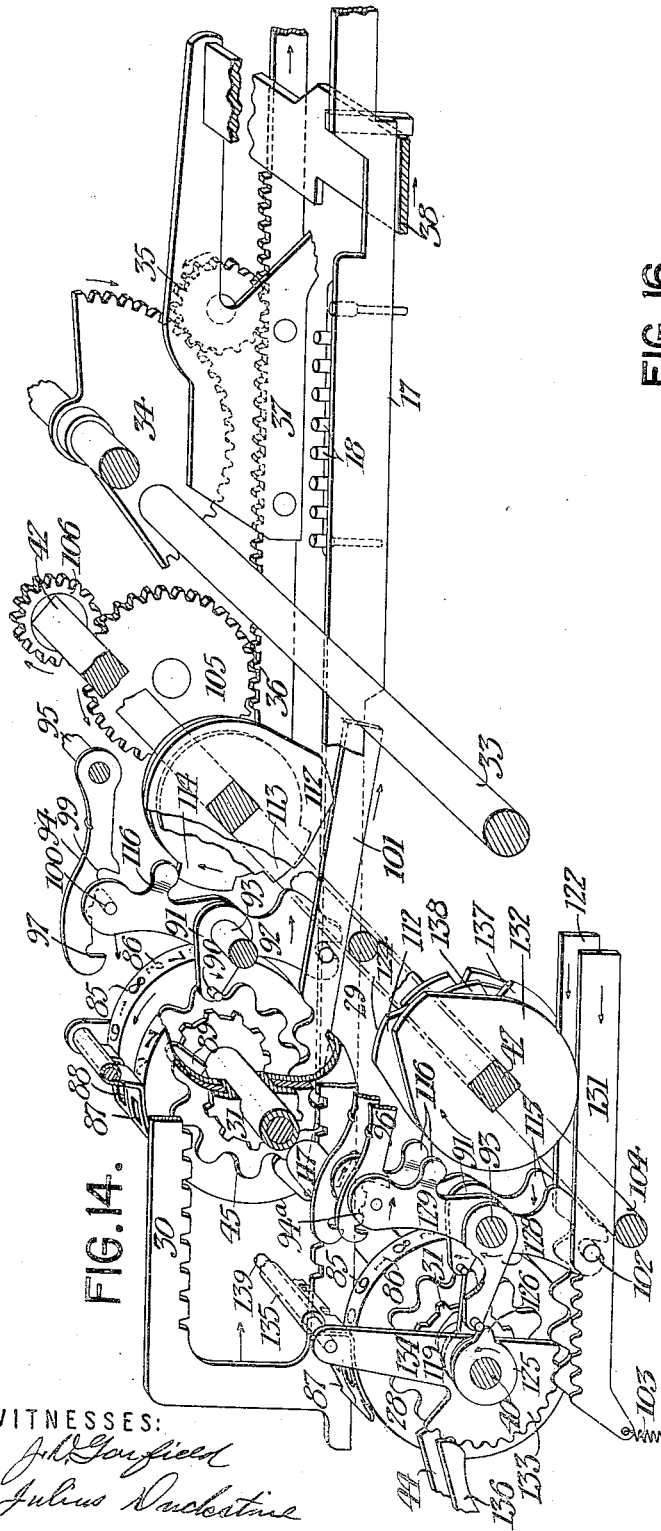
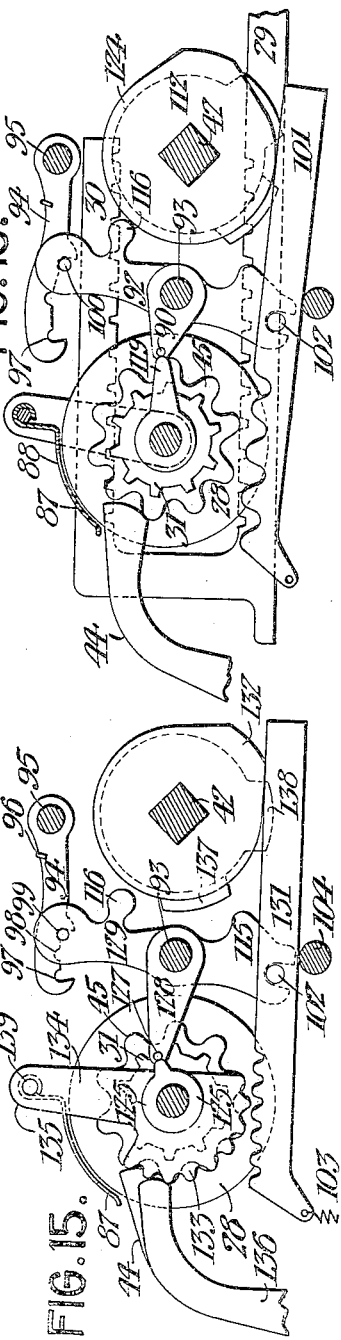
WITNESSES:
INVENTOR:

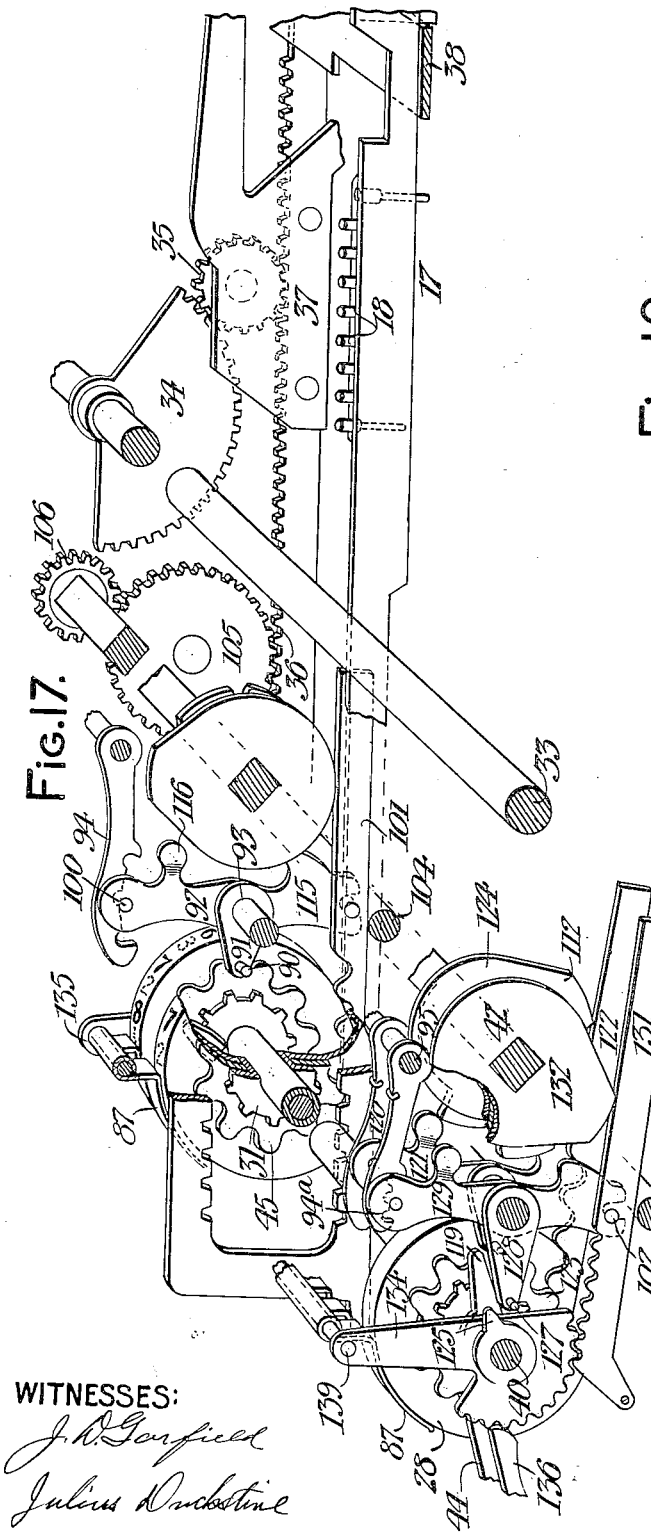

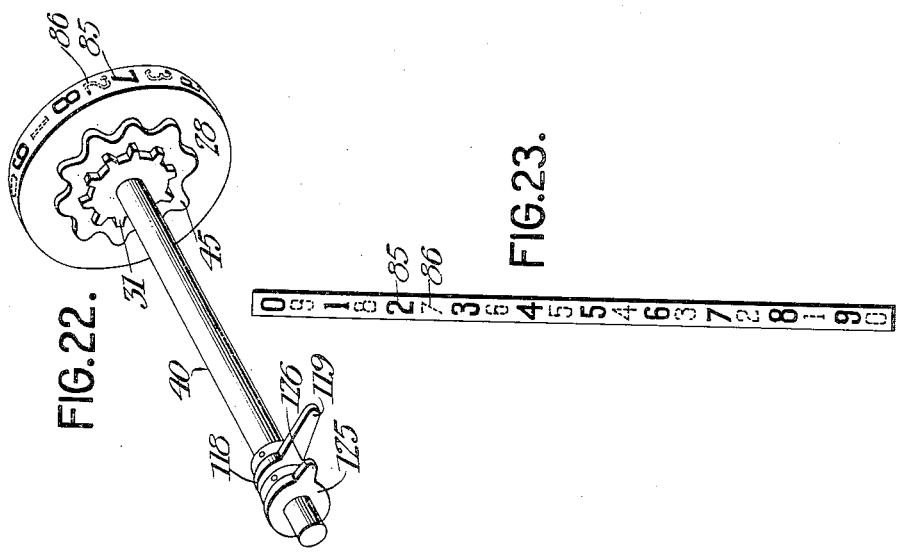

UNITED STATES PATENT OFFICE.

HORATIO WHITING, OF NEW YORK, N. Y., ASSIGNOR, BY MESNE ASSIGNMENTS, TO UNDERWOOD COMPUTING MACHINE COMPANY, OF NEW YORK, N. Y., A CORPORATION OF NEW YORK.

COMBINED TYPE-WRITING AND COMPUTING MACHINE.

1,288,333.     Specification of Letters Patent.     Patented Dec. 17, 1918.

Application filed May 14, 1914. Serial No. 838,513.

*To all whom it may concern:*

Be it known that I, HORATIO WHITING, a citizen of the United States, residing in New York city, in the county of New York and State of New York, have invented certain new and useful Improvements in Combined Type-Writing and Computing Machines, of which the following is a specification.

This invention relates to a combined type-writing and computing machine, more especially one adapted to make algebraic summations, and is an improvement on an application of Hans Hanson, No. 758,091, filed April 1, 1913.

The function and utility of this invention may be best illustrated by an example. In computing a depositor's account in a bank, the balance is first run into the computing machine, and the checks withdrawn may be subtracted therefrom. If we suppose the depositor has a balance of $50, and issues a check for $60, it will be seen that he has overdrawn his account an amount of $10. Now, then, in order to have the computing machine mechanically make this algebraic summation, that is, take away the $60 from the lesser number, $50 already registered, the present invention is used.

To accomplish this, the dial wheels of the register or computing head are each provided with two sets of digits running in opposite directions, one set being preferably in black to denote positive or credit items, and the other set preferably in red to denote negative or debit items. The digits of the two sets ascend in opposite directions, with the digits of one set interposed alternately between the digits of the other set, and in such a way that the co-digits or complements of the two sets are arranged alongside each other. In other words, the sum of each pair of a red and a black digit will equal nine.

When an algebraic summation is made on the register, then not only the amount which is already exhibited thereon will be wiped out, but the computing wheels rotated in a descending direction to register the amount of the difference.

This will cause the highest computing wheel actuated to go backward through zero, so that it borrows "1" from the computing wheel next higher, which in turn goes back through zero and borrows "1" from the computing wheel next higher to it. This goes on throughout the series of computing wheels to the highest computing wheel available, which likewise goes back through zero.

Advantage is taken of this action to shift a shutter or indicating mechanism, so as to change from the digits which were previously exhibited on one side of the shifting through zero, to the other set of digits which are the complements of those at the line of sight.

If we take the example above illustrated, that is, subtracting 60 from 50, the tens computing wheel will be rotated backward six steps, so that it would successively bring to the sight opening, in black, 4, 3, 2, 1, 0 and 9. The "1" having been borrowed from all computing wheels of higher denomination, these would all stand at "9," so that the register would exhibit without the shifting of the shutter or indicating mechanism, 9999990.

The passing of the highest computing wheel through zero, however, shifts the shutter or indicating mechanism, so that the complements of these numbers would be exhibited in the register, indicating, in red, 0000009. This, it will be observed, is not the correct and true difference between plus 50 and minus 60, but one less than this difference.

In passing through zero, what is known as the "fugitive 1" is lost, and has to be supplied to the computing wheel of lowest denomination. To do this, advantage is taken of the same action of the highest computing wheel passing through zero, which was used in shifting the shutter or indicating mechanism to kick in the extra or lost unit. In other words, ten is in effect carried or borrowed from the computing wheel of highest denomination to the computing wheel of lowest denomination in the direction of rotation of the computing wheel of highest denomination at the instant it passes through zero, so that in the example above given, the units computing wheel would have been rotated backward one step by the kicking in of this extra unit, and would have borrowed "1" from the tens computing wheel, so that it itself would bring to the sight opening, in black, "9," and to the tens sight opening, in black, "8," so that if the shutter or indicating mechanism were not shifted, "89"

would be exhibited in black. But the shutter mechanism is shifted, and the complement, in red, of this number "89" is shown, which should be "10." The register then will show, in red, throughout, 0000010, the correct and true algebraic summation of plus 50 and minus 60.

In the present embodiment the invention is applied to a reverse subtraction machine, that is, one in which the dial wheels are actually rotated in opposite direction to perform addition and subtraction, and also a machine in which the tens-carrying action takes place subsequent to the running up of the numbers in the dial, which action is called a "delayed carry over."

In this case, the burden of shifting the shutter or indicating mechanism, and of kicking in the extra unit in the units computing wheel, is assumed by the tens-carrying mechanism or parts auxiliary thereto, which acts subsequent to the running of the numbers on the computing wheels, and depends on the passing of the computing wheel of highest denomination through zero, which sets this mechanism for action.

Inasmuch as, in this type of machine the tens carrying takes place subsequent to the running up of numbers, provision is made for a double tens-carrying operation, so that a tens-carrying operation which takes place successively from units to tens, to hundreds, to thousands, and so on, may be repeated in case a carry over starts at any higher computing wheel, must be carried not only to the computing wheel of lowest denomination, but also to some other successive computing wheels of higher denomination than the units computing wheel.

Other features and advantages will hereinafter appear.

In the accompanying drawings—

Figure 1 is a vertical section taken from front to rear through the combined typewriting and computing machine, with parts omitted for the sake of simplicity, the action of which parts, if further elucidation is necessary, may be obtained by reference to the application No. 758,091 above mentioned.

Fig. 2 is a detail perspective view showing the starting or tripping mechanism for initiating a carry over to the units computing wheel, and a shifting of the shutter or shield indicating mechanism at the passing of the computing wheel of highest denomination through zero in making an algebraic summation. The tens-carrying mechanism shown in this view illustrates merely that between any two intermediate dial or computing wheels.

Fig. 3 is a detail section through the gear and its clutch connection to the tens-carrying assisting shaft, showing how this gear drives the shaft solely when the general operator is moving in a return direction after the numbers have been run up into the computing or dial wheels, the gear being of such dimension and the train thereto of such ratio, that the tens-carrying shaft will be rotated two complete revolutions during the return movement of the general operator.

Fig. 4 is a skeleton perspective view showing details of the denominational selecting mechanism, whereby the denominations as computed are accorded with the denominations as type-written. The view also illustrates certain parts of the shutter mechanism.

Fig. 5 is a detail view in vertical section showing a tens-carrying set in the act of carrying tens after the ten-carrying mechanism has been set and at the beginning of the carry by the assisting mechanism, to the computing wheel next higher.

Fig. 6 is a detail view showing some of the parts illustrated in Fig. 5, and showing the action started in Fig. 5 as having been just completed.

Fig. 7 is a detail view showing one of the denominational members as being positioned from the carriage to its effective location, where it is subservient to the pin-setting mechanism, and also showing one of the pins actually being set.

Fig. 8 is a detail skeleton perspective view of the subtraction-setting mechanism.

Fig. 9 is a detail horizontal section showing certain parts of the subtraction-setting mechanism, and also showing the means for bringing into play the ten-carrying mechanism to the units computing wheel, and the shifting mechanism for changing the position of the shutter or shield, the shutter or shield being broken away, and merely shown in coöperation with the two computing wheels of highest denominations, and disclosing therethrough the black or positive digits, which are indicated in full lines.

Fig. 10 is a detail of the locking means for holding the subtraction-setting key in its effective position.

Fig. 11 is a detail vertical section taken from left to right through the register, and showing how the computing wheel of highest denomination controls the operation of the setting of the tens-carrying mechanism to the units wheel and the shutter or shield-shifting mechanism.

Fig. 12 is a detail vertical section taken from front to rear of certain of the parts shown in Fig. 9.

Fig. 13 is a horizontal section showing the coöperation of the actuating means for the computing or dial wheels of the register, and certain parts of the setting mechanism therefor.

Fig. 14 is a skeleton perspective view showing tens as being borrowed by the computing wheel of next highest denomination from the computing wheel of highest denomination, so that the computing wheel of highest denomination is throwing through zero; thereby initiating or setting the tens-carrying mechanism to the units computing wheel, preparatory to kicking in the "fugitive 1", and also setting for action the shifting mechanism for the shield, to be subsequently shifted to show red digits, the black digits being shown in full lines, and the red in dotted lines.

Fig. 15 is a detail section from front to rear through the register, showing the shifting mechanism for the shutter set to a position, such that on a further rotation of the assisting tens-carrying shaft, the shutter will be shifted from showing black or positive figures now illustrated, to showing red or negative figures.

Fig. 16 is a detail sectional view taken from front to rear, showing the tens-carrying mechanism to the units computing wheel, which kicks in the extra unit, as just set to a position such that it can subsequently kick in this extra unit, but before the unit has actually been added to the units wheel.

Fig. 17 is a skeleton perspective view similar to Fig. 14, showing the mechanism in a slightly later period of its operation, just after the shutter has been shifted down to exhibit the red digits and while the tens-carrying mechanism to the units computing wheel is still in the act of kicking in the extra unit thereto.

Fig. 18 is a view similar to Fig. 15, showing the shutter in the act of being shifted from its positive position exhibiting black digits to its negative position exhibiting red digits.

Fig. 19 is a view similar to Fig. 16, showing the mechanism after the shutter has been shifted to its negative position, and the tens-carrying mechanism to the units computing wheel in the act of kicking in the extra unit thereto.

Fig. 20 is a vertical detail section taken from front to rear of the register similar to Figs. 18 and 19, and showing the shield or shutter in the act of being shifted from a position showing negative or red digits to a position showing positive or black digits, the action being the opposite to that in Fig. 18, and taking place when a larger positive number is being added to a smaller negative number exhibited by the register.

Fig. 21 is a view similar to Fig. 19, showing, however, the extra unit being kicked into the units wheel in the opposite direction when ascending through zero, as in adding a larger positive or credit number to a smaller negative or debit number exhibited by the register.

Fig. 22 is a detail skeleton perspective view showing the connection of the highest computing wheel to the starting or setting mechanism for the tens-carrying mechanism to the lowest computing wheel and for the shutter-shifting mechanism.

Fig. 23 is a developed view of one of the dial wheels showing the relation of the two sets or series of digits thereon, and the interspersion or juxtaposition of the co-digits.

Referring more particularly to the separate parts of this invention as embodied in the form shown in the drawings, numeral keys 1 and alphabet keys 2 depress key levers 3, to rock bell cranks 4, to swing typebars 5 up rearwardly against the front side of a platen 6 mounted to rotate on a carriage 7. The carriage 7 travels step by step under the pull of a spring barrel (not shown), and under the control of an escapement mechanism indicated in general at 8, which is operated at the striking of any of numeral or alphabet keys, by a heel 9 located on each of the type-bars 5.

The numeral keys 1, in addition to operating their type actions, each depress a thrust link 10, which engages an arm 13, so as to rock a shaft 14. There is one of these rock shafts 14 for each of the numeral keys 1, and is arranged to be operated by its accordant numeral key.

Each of the rock shafts 14 is provided with an arm 15, which engages and actuates a linkage 16, which is one of a set arranged transversely to a series of denominational members 17, which are each provided with a series of pins 18 corresponding to the digits from "1" to "9." That is to say, the pins 18 are formed in longitudinal rows on the denominational members 17, and they extend also in transverse alinement so as to form rows of pins of the same value corresponding to the same numeral keys.

The linkages 16, of which there are nine, one for each numeral key, are for the purpose of setting the pins 18, each linkage being capable of setting any pins of a transverse row of the same value. Normally, however, the pins 18 are not located within the sphere of operation of the linkages 16, and in this case, the disjunction is effected by having the pins 18 out of vertical alinement with their accordant pin-setting linkages 16. The purpose of this is to enable but a single pin to be set corresponding to the actuation of a numeral key, and this pin to be set in a denomination corresponding to the denomination in which the digit is written on the work-sheet carried by the carriage 7.

To effect this cross selection, the subservience of the denominational members and their pins to the pin-setting linkages, is controlled from the carriage. To do this, the carriage 7 carries one or more stops or tappets 19, which are adjustably mounted at letter-space intervals on a rack 20, so as to vary the particular instant or point in the travel of the carriage, that they come into operation.

The tappet 19 as it travels along with the carriage 7, comes *seriatim* into engagement with a series of transposition levers 21, which are normally held in the path of the tappet by springs 22. Each lever 21 is pivotally mounted intermediate its ends, as by means of a rod 23, so that when rocked by the tappet 19 coming into engagement therewith, it will in turn operate or shift the accordant one of the denominational members 17 with which it engages at its lower end. The shifting is such as to bring the particular denominational member 17 to such a position that the pins 18 thereon will be subservient to the pin-setting linkages 16, and so that any pin thereon can be set by the actuation of the corresponding numeral key. The levers 21 are called "transposition levers", because they invert the order of operation. That is to say, the carriage travels from left to right operating the upper ends of the levers 21 successively from right to left, but these levers in turn operate or bring into play, the denominational members 17 from left to right. The arrangement of the series of levers whereby this effect is produced, will be readily understood by reference to Fig. 4, where it will be seen that the order of succession at the lower end of the levers is inverted from that at the upper end of the levers.

The setting of each denominational member 17 to the position in which it is in play, is done against the action of a tentative detent 24, which is pivoted intermediate its ends, and held by means of a spring 25. This detent acts as a retriever to return its corresponding denominational member 17 to its normal position after the tappet 19 has passed by the associated lever in the advancement of the carriage to the next letter space. The detents 24 engage shoulders 26 of the denominational members 17, and extend in depressions in the denominational members. These detents will, however, not prevent forced movements of the denominational members 17 forwardly beyond them, as the spring 25 will yield to permit the detents to ride on the continuous upper surface 27 of the denominational members 17.

The setting of the pins 18, one on each denominational member 17, determines the extent of movement thereof. These denominational members are also actuating members for a series of dial or computing wheels 28, which form a computing head, totalizer or register.

To drive these dial or computing wheels 28, each denominational member 17, which is also an actuating member, is provided, at its forward end, with a pair of spaced oppositely facing racks 29 and 30 (Fig. 12), which are arranged to alternatively engage pinions 31 secured to the dial wheels 28 to rotate the same. Normally both of the racks 29 and 30 are out of engagement with the pinions 31, so that the dial wheels are free and clear of these racks.

When all of the digits of a number have been set up on the pins 18, and it is desired to run this number into the computing or dial wheels 28, a hand crank or other motive means 32 is operated. The hand crank 32 is secured to a shaft 33, to rotate the same, which shaft has a segment 34 secured thereon, and driving one or more gears 35 engaging and driving one or more rack bars 36 of a general operator 37. The general operator 37 includes a cross bar 38, which is arranged to engage such of the pins 18 as have been set on the rack bars 17, and advance the rack bars amounts corresponding to the particular pins set. On the return movement of the general operator 37, this cross bar engages lugs 39 to likewise return the actuating rack bars 17 to their normal position.

As has been stated above, however, the rack bars are normally out of engagement with the pinions 31, so that they cannot drive the same until engagement is brought about in one way or the other for addition or subtraction. To permit this before the cross bar 38 of the general operator comes into engagement with any set pin, coöperation between the rack bars 17 and the gears 31 is brought about, a lost motion being provided between the cross bar 38 and the highest valued pins 18.

In order to bring about a driving relation between the actuating rack bars 17 and the gears 31 of the dial wheels, the whole nest of dial wheels is shifted bodily from an intermediate neutral position to a position meshing the gears 31 with either the lower series of racks 29 for addition, or the upper series of racks 30 for subtraction.

For this purpose the dial wheels 28 and the gears 31 are mounted on a shaft 40, which in turn is rotatably mounted in a frame 41 (Fig. 12), to swing about a shaft 42 as a center. The frame is provided with a cross rod 43 at its front end, on which are mounted spring-pressed detents 44 engaging in tens-carrying gears 45, one of which is provided for each dial wheel. These detents serve to yieldingly lock the dial wheels in positions corresponding to their stopping points, and so that numbers will be visible through a sight opening 46 (Fig. 1) in the casing. Centralizing arms 47 are operated by springs 48 to engage opposite ends of the shaft 40, to yieldingly maintain the same in an intermediate or neutral position by virtue of the V-shaped cam grooves in said arms (Fig. 12). Shifting mechanism for the frame and the register is provided for moving it up or down to a subtracting or an adding position, the motion of the register and its frame being guided vertically by the shaft 40 extending through vertical slots 49 in a frame 50.

The shifting mechanism for the register includes a pair of links 51 (Figs. 11 and 12) connected to the ends of the shaft 40, and also connected to a tie rod 52. This tie rod has secured thereto a pair of arms 53 (Figs. 1, 4 and 12), by which it may be swung up and down together with the links 51. The arms 53 are secured to a shaft 54, so as to rock therewith. One of the arms 53 is provided with an extension 55, with which it forms a shifting lever. The extension 55 is bifurcated, so as to have an adding arm 56 and a subtracting arm 57.

Normally when it is desired to add, a cam 58 secured for rotation with the general operator shaft 33, will be in register with and engagement with a tripable following pawl 59 pivotally mounted on the adding arm 56. A spring 60 normally holds the following pawl 59 in an effective position against a stop so as to enable the cam 58 to rock the arm 56, and thus rock the shifting lever including the arm 53. The direction of rocking by the cam 58 will be such as to swing the arm 53 downwardly and bring the gears 31 of the dial wheels 28 into mesh with the lower adding racks 29 of the denominational members 17.

The cam 58 is so positioned circumferentially on the shaft 33, that during the initial portion of the forward stroke of the general operator, and thus of the crank 32, the shifting lever will be rocked to bring about an engagement between the racks 29 and the gears 31 before the cross bar 38 has come into engagement with any of the set pins, so that at the instant any of the actuating members 17 are driven forwardly, they will be in mesh with the gears 31, and can transmit their motion thereto, and thus to the dial wheels.

During the return stroke of the general operator, and thus of the shaft 33, the clockwise rotation of the cam 58 will trip the following pawl 59 to an ineffective position, permitting the spring 48 and the centralizing arms 47 to move the dial wheels and their gears 31 to a neutral position before the general operator cross bar 38 has had time to come into engagement with any of the lugs 39 on the actuating rack bars 17. This, then, disengages the register *in toto* from its actuating members before the return movement thereof, so that they will not be rotated thereby during the return stroke of the general operator. When the dip in the cam 58 arrives opposite the pawl 59, the spring 60 will return it to its normal effective position.

When it is desired to subtract, in place of the following pawl 59 being operated by its cam 58, a following pawl 61 will be operated by a cam 62 secured for rotation with the shaft 33. This following pawl 61 is pivotally mounted on the arm 57, and normally held against a stop in an effective position by a spring 63, so that when its cam 62 rotates, the initial rotation of the shaft 33 will swing the arm 57 downwardly, and thus swing the arm 53 upwardly, so as to shift the frame 41 and the shaft 40 upwardly, carrying all of the gears 31 into mesh with the subtraction racks 30. Then, when a further forward movement of the general operator takes place, the actuating members 17 are prepared, through their racks 30, to drive the dial wheels amounts corresponding to the pins set.

During the return stroke of the general operator, and hence the return rotation of the shaft 33, the cam 62 will flip the following pawl 61 by friction therewith, to an ineffective position against the tension of the spring 63, permitting the springs 48, and the centralizing or retrieving arms 47, to snap the frame 41 and the register as a whole to an intermediate neutral position.

It will be noted that both the cams 58 and 62 are not in operation at the same time, and, in fact, they are connected so that only one can be in operation, so that either adding or subtracting may be performed.

To accomplish this, the following pawl 59 is located on the opposite side of its arm 56 from that which the following pawl 61 is located on its arm 57. The cams 58 and 62 are connected together as by means of a sleeve 63ª (Fig. 8), so that they may be slid longitudinally of the shaft 33. The cams are, however, splined on to the shaft 33, so as to rotate therewith in either position of adjustment, by means of a pin 64 secured to an arm 65, and extending through an opening in the cams, the arm 65 being secured to the shaft 33 for rotation therewith.

Normally a spring 66 (Fig. 12) holds the cams and the sleeve 63ª in a position corresponding to the engagement of the cam 58 with the follower 59, and also corresponding to the disengagement and out-of-register of the cam 62 with the follower 61. That is to say, the cams are normally in a position corresponding to an adding shifting of the register frame.

When it is desired to subtract, the sleeve 63ª and the cams carried thereby are shifted so as to bring the cam 58 out of register and coöperation with its follower 59, and also so as to bring the cam 62 into register with its follower 61.

To do this, a subtraction key 67 extends out from the front of the machine, where it may be readily operated. The subtraction key when pressed rearwardly against the tension of a spring 68, will cause a cam shifter 69 carried thereby to engage the end of the sleeve 63ᵃ, and slide it longitudinally of the shaft 33, together with the cams 58 and 62, moving the cam 58 out of engagement with its follower and out of action, and bringing the cam 62 into engagement with its follower and into action. When the subtraction key 67 is pressed rearwardly to its effective position determining a subsequent subtracting operation of the machine, a latch 70 engages a notch 71 therein, and temporarily holds it in its effective position. This latch may be released at the end of each subtracting operation, from the general operator.

For this purpose, a one-way acting dog 72 is provided on the general operator, which snaps idly by an arm 73 during the forward movement of the general operator. On the return movement of the general operator, the arm is rocked by the dog 72, and in turn rocks a shaft 74, on which is provided an arm 75, engaging a pin-restoring plate 76. The pin-restoring plate snaps up against all of the pins, and unsets any that have been previously set. The restoring plate is supported for horizontal movement by a number of parallel bell cranks 77, connected to move in unison by links 78. Certain of these bell cranks are secured to a rock shaft 79, which is provided with a trip 80. This trip is arranged to engage an extension 81 on the latch 70.

It will be seen that at the end of the return movement of the general operator, the latch 70 will be tripped to permit the subtraction key 67 to return to its normal position, under the pull of the spring 68, and thus permit the subtraction cam to be moved by the spring 66 to its ineffective position, while the adding cam 58 is moved to its effective position.

If it should be desired to lock the subtraction key in its effective position for a number of operations, and thus prevent the return to an adding position, of the computing mechanism, a latch 82 (Figs. 9 and 10) may be shifted into engagement with a notch 83 in the subtraction key rod, and held in such a position by a spring detent 84. Subtraction operations will then be repeated so long as the latch 82 is in its locked position.

Each dial or computing wheel has two series of numbers 85 and 86 (Fig. 23), the series 85, which is shown in full lines, may be in black, and the series 86, which is shown in dotted lines, may be in red, the black series 85 corresponding to positive or credit items, and the red series 86 corresponding to negative or debit items. It will be noted that the series 85 ascends from "0" to "9" in one direction, and the series 86 ascends from "0" to "9" in the opposite direction, the digits of one series alternating with the digits of the other series. The arrangement is such also that each digit when paired with an adjacent digit, and added thereto, gives the sum of nine, so that these paired digits are complements or co-digits of each other. The sight opening 46 is large enough so that two adjacent digits on a computing wheel or dial wheel, can be visible therethrough at the same time.

Provision is made, however, so as to disclose only one set of digits, either the black or the red, at one time. To do this, a shield or shutter 87 is provided, which has openings 88 of just sufficient size to permit one digit on each computing or dial wheel to be visible at a time. The openings 88 are arranged in alinement, so that a whole row of digits in the same line will be visible at the same time through the sight opening 46 in the casing. This shield or shutter is shiftable so as to move from disclosing black digits to disclosing red digits on the computing or dial wheels, thereby forming an indicating mechanism to point out whether the item exhibited by the register is positive or negative, that is, a credit or a debit item.

Before going into a description of the mechanism for shifting the shield or shutter, it would be well to describe the tens-carrying mechanism, as this is depended upon, to a certain extent, in this operation.

For the purpose of carrying tens from each computing wheel of lower denomination to the next computing wheel of higher denomination, and also for the purpose of borrowing "1" from each computing wheel of higher denomination for each computing wheel of next lower denomination, there is provided on each computing or dial wheel 28, a starting tooth 89. This starting tooth is so arranged on each computing or dial wheel, that as the "0," in an adding operation, of the exhibited series of digits comes visible at the sight opening, it will engage and shift a pin 90 (Fig. 2) on an arm 91, from the position shown in Fig. 2 to the position shown in Fig. 5.

If a subtracting operation were being performed, and the dial or computing wheel were rotating in the opposite direction, as the dial wheel passed from exhibiting "0" to exhibiting "9", the starting tooth 89 would come into engagement with the pin 90 in the opposite direction, so as to shift the arm 91 in the opposite direction to the opposite limit of its movement.

In whichever way the arm 91 is shifted, it will transmit its movement to a double-armed shifting lever 92, which rotates about the axis of a shaft 93. This arm has two limits of movement according to whether addition or subtraction is being performed, which are determined by a three-way detent 94. The detent 94 is pivoted at 95, and held to its work yieldingly by a spring 96. This detent has three notches 97, 98 and 99, corresponding, respectively, to the adding, neutral, and subtracting carry-over positions of the lever 92. That is to say, normally a pin 100 on the lever 92 is in the neutral notch 98. If the dial or computing wheel is being rotated in the direction of the arrow in Fig. 5, or in an adding direction, the special starting tooth 89 will engage the pin 90, to shift the lever 92 to the position shown in Fig. 5, wherein the pin 100 will be located in the notch 97, corresponding to the setting of the tens-carrying mechanism for adding.

If the dial wheel 28 were rotated in the opposite direction to the arrow in Fig. 5, the lever 92 would have been shifted by the special tooth 89, to the opposite extreme of its movement, whereby the pin 100 and the lever 92 would be locked by engagement of the pin with the subtracting notch 99.

The purpose of shifting the lever 92 is to set the tens-carrying rack 101 from an intermediate home position to a position longitudinally one side or the other of its home position. Each of these racks 101 is connected to be moved by its associated shifting lever 92, by means of a pin-and-slot connection 102. The racks 101 are normally held out of engagement with the tens-carrying gears 45, by means of individual springs 103, and rest for a fulcruming sliding movement on a cross bar 104.

As has been noted above, the running up of the numbers on the dial or computing wheels 28, takes place during the forward stroke of the general operator 37, and the forward stroke of the hand crank 32. The tens carrying takes place during the return stroke of the general operator.

For this purpose, one of the racks 36 drives a gear 105 (Figs. 1 and 3), which meshes with a pinion 106 loosely mounted on the shaft 42. The pinion 106 may, however, be connected to drive the shaft 42, by means of a clutch 107 (Fig. 3), during the return stroke of the general operator. This clutch may comprise a ball or roller 108 pressed by a spring 109 outwardly, so as to tend to occupy a cam pocket or cavity 110 in the pinion 106. It will be seen that if the gear 106 rotates counter-clockwise in this figure, as would happen when the general operator is moving forwardly, the cam surface of the cam pocket 110 forces the ball 108 against the tension of its spring, back into a socket 111 provided in the shaft 42, so that the pinion 106 would rotate idly without driving the shaft 42. When, however, the pinion 106 is driven in a clockwise direction, as during the return stroke of the general operator, then the ball or roller 107 will first be shifted out into the pocket 110, and the abrupt side of said pocket will engage the ball or roller, and the latter form a positive connection between the pinion 106 and the shaft 42, so that the shaft will be driven. The train of gearing between the rack 36 of the general operator 37, and the pinion 106, is such that the shaft 42 will be driven two complete revolutions during the return movement of the general operator.

As has been stated above, there is one of the shifting or tens-carrying levers 92 between each computing or dial wheel of lower denomination and the next higher wheel, so that there is likewise one of the tens-carrying racks 110 engaging each computing wheel of higher denomination than the units computing wheel. For each tens-carrying group, there is a set or group of cams including a rack-shifting cam 112, an adding shifting cam 113, and a subtracting shifting cam 114. These cams are all secured to the shaft 42 in such a relation that the cam 112 will first come into engagement with the associated tens-carrying rack 101, and shift it to the position shown in Fig. 5, where it engages the corresponding tens-carrying gear 45.

Now, if the dial wheel of lower denomination had made one complete revolution, or at least, passed from "9" to "0" in an adding direction, the lever 92 would be in the position shown in Fig. 5, ready for the cam 113 to come into engagement with an enlargement or follower 115. The rack 101 having previously been shifted by the cam 112 into engagement with its tens-carrying gear 45, will move forwardly as the cam 113 shifts the lower end of the lever 92 forwardly. The amount of this movement will be such as to bring the lever 92 to a neutral position, and also such as to rotate the dial or computing wheel 28, one-tenth of a revolution, if the computation is in the decimal system.

The subtracting cam 114 is so located with respect to the rack-shifting cam 112, that it would come into play when the cam 112 has the rack 101 positioned in engagement with the associated tens-carrying gear 45, in case the lever 92 had been shifted previously to the opposite extreme of its movement with the pin 100 in engagement with the subtracting notch 99. The lever 92 is provided with an enlargement or follower 116, offset out of the plane of the follower 115, so as to be engaged by the cam 114, which latter is in a different plane from the cam 113.

The cam 114, through the follower 116, also shifts the lever 92 to a neutral position, thereby moving the rack 101 from a position one step in advance of this neutral position, to its neutral position, thus rotating the dial or computing wheel connected thereto one step backwardly, or in a direction opposite to that of the arrow in Fig. 5, so as to effect a borrowing of "1" as in a subtracting operation.

The cams 112, 113 and 114 are secured so as to have the same relation with each other, and a given relation to the starting and finishing point of the shaft 42. The groups of cams, of which there is one group between each computing wheel of lower denomination and the next higher computing wheel, are set on the shaft 42 in a spiral relation, so that they will come into play successively and *seriatim*. That is to say, the cam group between the units and tens orders will come into play first; that between the tens and hundreds orders second; between the hundreds and thousands orders third, and so on, up to the computing wheel of highest denomination. This enables, when any tens-carrying operation which might set the tens-carrying mechanism of the next higher computing wheel, such tens-carrying operation to be effected in its turn, so that all the wheels might stand at "9" with the exception of the units wheel, which may have made a complete revolution, and this unit carried successively to all computing wheels of higher denomination.

The tens-carrying mechanism thus far described, provides for tens carrying and tens borrowing operations between computing wheels of lower to higher denominations, from units to tens, to hundreds, to thousands, on up to the computing wheel of highest denomination. Now, in an algebraic summation, that is, when the register exhibits a small number and a number of greater magnitude is subtracted therefrom, it is desirable to carry from the computing wheel of highest denomination to the computing wheel of lowest denomination; that is, the units computing wheel.

For this purpose, the computing wheel of highest denomination, which may or may not be an idle or silent computing wheel, is secured to the shaft 40 (Fig. 11). All the other dial or computing wheels and their gears 31 and 45 are loosely mounted with respect to the shaft 40, and may be spaced therefrom by a sleeve 117, so that their rotation and its rotation will not effect each other.

Secured to the shaft 40, below the computing wheel of lowest denomination, that is, the units computing wheel, there is provided a disk or member 118 (Figs. 17 and 19), having a special starting tooth 119, which is arranged to engage and operate a tens-carrying set 120, similar to the other tens-carrying sets, and arranged to carry "1" to the units computing wheel in one direction or the other according to the direction of rotation of the highest computing wheel, which initiates the tens-carrying operation. That is to say, this tens-carrying set 120 includes a shifting lever 121, and a rack 122 meshing with a gear 123 on the units computing or dial wheel 28. The tens-carrying set 120 also embodies a group of cams 124, which are similar to the other groups of cams, but are so set as to come into operation after the group of cams of the computing wheel of highest denomination, whereby if the computing wheel of highest denomination should be thrust through zero in a reverse direction by a borrowing or tens-carrying operation, this unit may be carried to the computing wheel of lowest denomination subsequently, and may also be carried to the other computing wheels above the units computing wheel from the units computing wheel, if such is necessary by the particular arrangement of digits exhibited by the dial or computing wheels. Such a tens-carrying operation, which occurs subsequent to a tens carrying to the highest computing wheel, is enabled by the double rotation of the shaft 42.

It will be noted that this tens-carrying set to the units computing wheel may kick in "1" in one direction or the other, according to the rotation of the computing wheel of highest denomination. This provides for the "fugitive 1" necessary in making an algebraic summation. The actual burden of kicking in the "1" is, however, taken by the assisting drive shaft 42, and is not performed by the dial wheel, so that any dial wheel in its rotation is merely called upon to set the tens-carrying set for the next computing wheel, the units computing wheel being considered next to the computing wheel of highest denomination where it enables carrying thereto.

In addition to the highest computing wheel enabling the kicking in of the "fugitive 1" to the units computing wheel, it also enables the shifting of the shutter or shield 87 from indicating one set of digits, to indicating the other set of co-digits. That is to say, from exhibiting black to exhibiting red, or vice versa.

For this purpose, there is also secured to the shaft 40, to which it will be remembered the computing wheel of highest denomination is secured, a starting member 125, which is so located with respect to the zero of the highest computing wheel, that a starting tooth 126 will engage and shift a pin 127 on an arm 128, when the highest computing or dial wheel passes from "0" to "9" in a subtracting direction of the particular digits exhibited. The direction of shift depends upon the direction of rotation of the computing wheel of highest denomination.

The arm 128 is connected to shift a lever 129, which forms part of a shifting mechanism 130, similar in its form and operation to the tens-carrying sets, such as the set 120 for the units computing wheel. This shifting mechanism 129 includes a rack 131, similar to the tens-carrying racks, and operated by the lever 129. A group of cams 132, similar to the tens-carrying groups of cams, is also provided for positioning the rack 131 to bring it into engagement with a segment 133, and for operating the lever 129 in one direction or the other, and thus operating the rack 131, to shift the shutter 87. The segment 133 is formed on one arm or side plate 134 of a frame 135, which supports the shutter or shield 87. This frame 135 is loosely mounted on the shaft 40, so as to swing back and forth relatively thereto. A spring detent 136 may yieldingly lock the shutter or shield in either of its positions of adjustment, and is mounted similar to the detents for the computing wheels, of which detents there is also one provided for the units computing or dial wheel.

It will be noted that the tooth 126 works in a pitch circle considerably less than that of the other starting key; for example, the starting tooth of the computing wheel of lowest denomination. The ratio is about one-half of that between the other starting teeth and their tens-carrying sets, so that the lever 129 will be shifted one-half the distance. To correspond to this, the detent for the lever 129, especially indicated at 94ª, has its locking notches set close together, to determine the shorter swings of the lever 129.

It will be readily seen that if the lever 129 is shifted in the first instance, only one-half the distance from its neutral position, the shifting cams 137 and 138 of the group 132 can only shift back to this neutral position, thus effecting a movement of the rack 131, one-half that of the similar racks, that is, the tens-carrying racks. The teeth of the rack 131 and the teeth of the segment 133 are smaller in correspondence. We therefore have for a shifting movement of the shield 87, a movement equal to one-twentieth of a revolution of a computing or dial wheel. This is required, inasmuch as two successive co-digits, that is, a black and a red digit, whose sum is nine, are located at one-twentieth of a revolution from each other.

The computing wheel of highest denomination then controls a kicking in of "1" to the unit wheel, which amounts to one-tenth of a rotation of the units wheel, and also controls a shifting of the shutter or shield from exhibiting one set of digits, to exhibiting the other set of digits, which amounts to a movement of one-twentieth of a revolution of the shield or shutter, as compared with a rotation of the computing or dial wheel.

The cam 137 controls the shifting to show red digits or debit items, such as an overdraft, and the cam 138 controls the shifting to show black digits or credit items, such as an actual balance at the bank.

The shield or shutter 87 is so formed that it will move up and down with the register as a whole, when the latter is moved from a neutral position to a subtracting or an adding position, and returned, without interfering with the denominational members or rack bars 17. For this purpose, the frame 135, which supports the shutter or shield, has a cross bar 139, on which the shutter or shield is mounted, which extends in considerable spaced relation from the dial or computing wheels, in order to permit the requisite amount of vertical play between the denominational members 17 and the cross bar 139. The shutter or shield is comblike, that is, slotted between each computing wheel, so as to form shielding sections, which conform to and hug the dial wheels quite closely, while permitting the rack bars 17 to pass therebetween.

As arranged for, the group of cams 132 are set in advance of the group 124, so that the shifting of the shield takes place before the kicking in of the digit to the units wheel. This is done merely for the purpose of distributing the load evenly throughout the return stroke of the general operator.

Variations may be resorted to within the scope of the invention, and portions of the improvements may be used without others.

Having thus described my invention, I claim:

1. The combination with a series of computing wheels, of tens-carrying mechanism between each computing wheel of lower denomination and the next higher computing wheel, tens-carrying mechanism to the computing wheel of lowest denomination, starting means for setting said tens-carrying mechanism to said lowest computing wheel from the highest computing wheel, and assisting means for operating said tens-carrying mechanisms when set successively from lowest to highest denomination, and for operating said tens-carrying mechanism for the lowest denomination subsequent to the operation of said tens-carrying mechanism for the highest denomination.

2. The combination with a series of computing wheels, of tens-carrying mechanism to each of said computing wheels including the computing wheel of lowest denomination, so that an extra unit may be carried to each computing wheel, an assisting shaft for said tens-carrying mechanism, and a series of members secured for rotation with said shaft, and mounted spirally on said shaft, so as to come into operation separately and successively.

3. The combination with a series of computing wheels, of tens-carrying mechanism to each of said computing wheels including the computing wheel of lowest denomination, so that an extra unit may be carried to each computing wheel, an assisting shaft, and a series of members secured for rotation with said shaft and mounted spirally on said shaft, so as to come into operation separately and successively, the member for the computing wheel of lowest denomination being arranged to come into action subsequent to the member for the computing wheel of highest denomination.

4. The combination with a series of computing wheels, of tens-carrying mechanism to each of said computing wheels including the computing wheel of lowest denomination, so that an extra unit may be carried to each computing wheel, an assisting shaft, a series of members secured for rotation with said shaft and mounted spirally on said shaft, so as to come into operation separately and successively, the member for the computing wheel of lowest denomination being arranged to come into action subsequent to the member for the computing wheel of highest denomination, and means for setting the tens-carrying mechanism to the computing wheel of lowest denomination from the computing wheel of highest denomination.

5. The combination with a series of dial wheels having two sets of digits thereon, of a shield shiftable to indicate one or the other of said sets of digits, operating means for said shield normally disconnected therefrom, means to shift said operating means into connection with said shield, and means to move said operating means after being so shifted to move said shield to indicate one or the other of said sets of digits.

6. The combination with a series of dial wheels, each having two sets of digits thereon, of a shield shiftable to indicate one or the other of said sets of digits, a segment connected to said shield, a rack for driving said segment, and means operable from the dial wheel of highest denomination for setting said rack to a position to be shifted to operate said shield.

7. The combination with a series of dial wheels, each having two sets of digits thereon, of a shield shiftable to indicate one or the other of said sets of digits, a rack normally disengaged from said shield for shifting said shield, and means brought into play by one of said dial wheels for enabling the shifting of said shield by said rack.

8. The combination with a series of dial wheels, each having two sets of digits thereon, of a shield shiftable to indicate one or the other of said sets of digits, said shield being normally independent of the movement of any of said dial wheels, means brought into play when one of said dial wheels passes from exhibiting "0" to exhibiting "9", for enabling the shifting of said shield, and driving means for operating said shifting means, said driving means being independent of origin from said dial wheels.

9. The combination with a series of dial wheels having two sets of numbers, of indicating mechanism shiftable to indicate one or the other of said sets of numbers, tens-carrying mechanism to the computing wheel of lowest denomination for kicking in an extra unit in said dial wheel of lowest denomination, shifting means for manipulating said indicating mechanism, and a single operating mechanism for operating both said shifting means and said tens-carrying mechanism.

10. The combination with a series of dial wheels having two sets of numbers, of indicating mechanism shiftable to indicate one or the other of said sets of numbers, tens-carrying mechanism to the dial wheel of lowest denomination for kicking in an extra unit in said dial wheel of lowest denomination, shifting means for manipulating said indicating mechanism, and a single operating mechanism for actuating both said shifting means and said tens-carrying mechanism.

11. The combination with a series of dial wheels, of a shutter for said dial wheels, a rack for shifting said shutter, said rack being normally disengaged from said shutter, a cam for shifting said rack into engagement with said shutter, and means for driving said rack when in engagement with said shutter.

12. The combination with a series of dial wheels, of a shutter for said dial wheels, a segment for said shutter, a rack for engaging said segment to shift said shutter, and a lever for shifting said rack, so as to shift said shutter in one direction or the other, according to its previous location.

13. The combination with a series of dial wheels, of an indicating mechanism for said dial wheels, a segment connected to said indicating mechanism, a rack for driving said segments, a lever for driving said rack, and a pair of cams for operating said lever in opposite directions, so as to drive said rack in opposite directions.

14. The combination with a series of dial wheels, of an indicating mechanism for said dial wheels, a segment connected to said indicating mechanism, a rack for driving said segment, a lever for driving said rack, a pair of cams for operating said lever in opposite directions, so as to drive said rack in opposite directions, and a cam for controlling the effectiveness of said rack to drive said segment and shift said indicating mechanism.

15. The combination with a series of dial wheels, of an indicating mechanism for said dial wheels, shifting means for said indicating mechanism, driving means for said shifting means, said shifting means being normally located without the sphere of operation of said driving means, and setting means for bringing said shifting means within the sphere of operation of said driving means.

16. The combination with a series of dial wheels, of indicating mechanism for said dial wheels, shifting means for said indicating mechanism, driving means for said shifting means, said driving means being normally ineffective to actuate said shifting means, and automatic means operated from one of said dial wheels for enabling the actuation of said shifting means by said driving means.

17. The combination with a series of dial wheels, of a shutter hugging the surface of said dial wheels, and driving means for said dial wheels, the surfaces of movement of said driving means and said dial wheels intersecting each other, and said shutter being comb-like to permit of the relative movement between said driving means and said dial wheels and said shutter.

18. The combination with a series of computing wheels, of means for accumulating numbers digit by digit, driving means for said computing means for transferring all of the accumulated digits of a number simultaneously to said computing wheels, tens-carrying mechanism from the lowest computing wheel to the highest, tens-carrying mechanism from the highest computing wheel to the lowest, and means for operating said tens-carrying mechanisms, subsequently to the transferring of the digits to said computing wheels.

19. The combination with a series of computing wheels, of means for accumulating a number digit by digit, transferring means selectively arranged to transfer numbers from said computing wheels either for addition or for subtraction, said transferring means acting to transfer all of the accumulated digits simultaneously, tens-carrying mechanism acting from lower to higher computing wheels, tens-carrying mechanism acting from a higher to a lower computing wheel, said tens-carrying mechanisms acting in either direction for addition or subtraction, and driving means for said tens-carrying mechanisms acting subsequently to the transferring of digits to said computing wheels.

20. The combination with a series of dial wheels, of a shutter for said dial wheels, a shaft connected to one of said dial wheels and extending through the remainder of said dial wheels, tens-carrying mechanism for another of said dial wheels, an actuating mechanism for said shutter, and long and short arms on said shaft arranged to determine differential movements of said tens-carrying mechanism and said actuating mechanism when said dial wheel to which said shaft is secured reaches a particular point in its rotation.

21. The combination with a series of dial wheels, of a shiftable shutter for said dial wheels, a tens-carrying mechanism for one of said dial wheels, an actuating mechanism for said shutter, differential means for giving preliminary sets to said tens-carrying mechanism and said actuating mechanism, and driving means for said actuating mechanism and said tens-carrying mechanism effective to overcome the sets and move the dial wheel of the tens-carrying mechanism and the shutter corresponding amounts.

22. The combination with a series of dial wheels, of a shiftable shutter for said dial wheels, a tens-carrying mechanism for one of said dial wheels, an actuating mechanism for said shutter, differential means for giving preliminary sets to said tens-carrying mechanism and said actuating mechanism, driving means for said actuating mechanism and said tens-carrying mechanism effective to overcome the sets and move the dial wheel of the tens-carrying mechanism and the shutter corresponding amounts, and differential detent means for holding said tens-carrying mechanism and said actuating mechanism yieldingly in their different positions.

23. The combination with a series of algebraic dial wheels, of a shutter for said dial wheels, a gear connected to said shutter, a rack normally disengaged from said gear and adapted to engage and drive the same to drive said shutter, and driving means for selectively operating said rack in one direction or the other.

24. The combination with a series of algebraic dial wheels, of a shutter for said dial wheels, a sector gear connected to said shutter, a rack for driving said gear normally disengaged therefrom, and connecting means for bringing said rack into mesh with said gear, and to drive the same in one direction or the other.

HORATIO WHITING.

Witnesses:
W. O. WESTPHAL,
TITUS H. IRONS.